United States Patent [19]
Krause

[11] 3,708,599
[45] Jan. 2, 1973

[54] HIGH TEMPERATURE APPARATUS
[75] Inventor: Wilhelm Krause, Essen, Germany
[73] Assignee: Thermal Transfer Corporation
[22] Filed: April 22, 1971
[21] Appl. No.: 136,506

[30] Foreign Application Priority Data
July 2, 1971 Germany.....................P 19 55 339.0
June 23, 1971 Germany.....................P 19 51 824.2

[52] U.S. Cl..................................13/1, 13/9, 13/31
[51] Int. Cl...............................................H05b 7/18
[58] Field of Search............13/1, 2, 9, 31; 219/121 P

[56] References Cited
UNITED STATES PATENTS 3,380,904  4/1968  Goldberger..........................13/9 X
3,239,592  3/1966  Snow....................................13/9

*Primary Examiner*—Roy N. Envall, Jr.
*Attorney*—Buell, Blenko & Ziesenheim

[57] ABSTRACT

A high temperature furnace unit is provided for melting metals which comprises a furnace container having at least one tuyere adjacent the bottom, at least one electrode in each such tuyere, a source of high voltage electrical current connected to said electrode capable of arc within said container, a source of combustible gas connected to each said tuyere feeding gas around the electrode at a pressure sufficient to form a pocket of gas around the electrode at the end of the tuyere.

10 Claims, 15 Drawing Figures

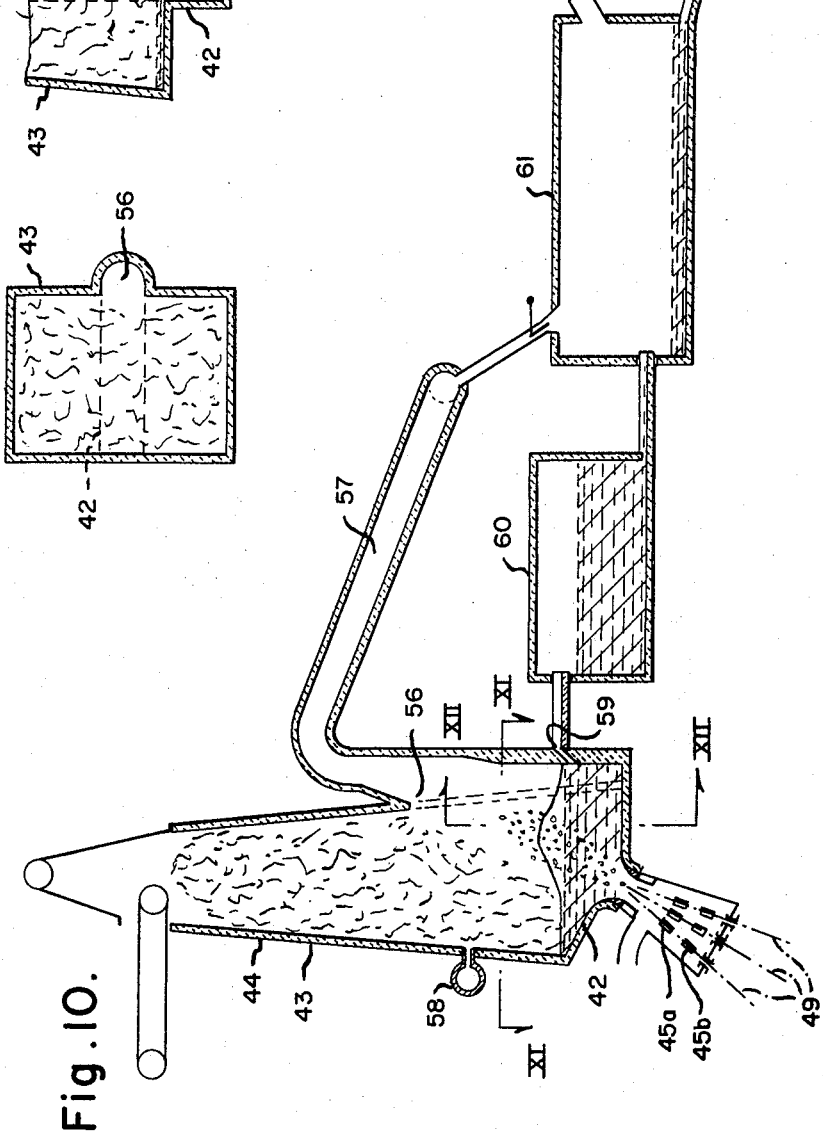
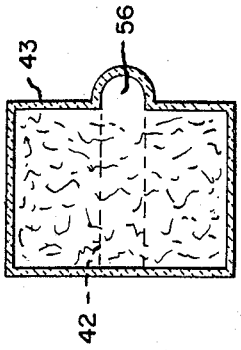
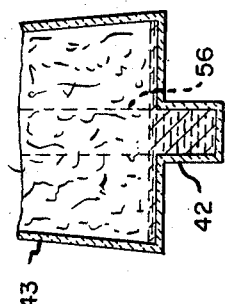

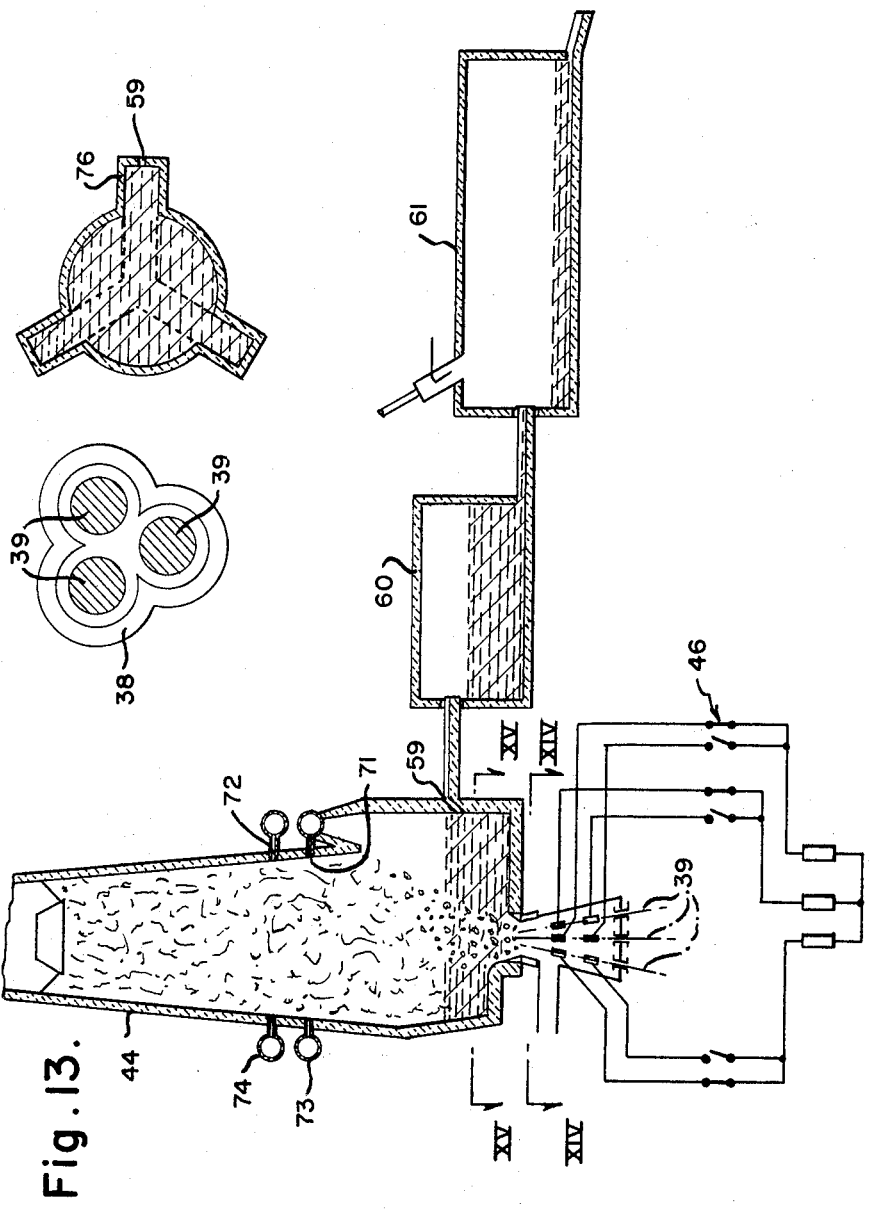

HIGH TEMPERATURE APPARATUS

This invention relates to high temperature apparatus and particularly to means for producing high temperatures in the melting of metals. The invention is particularly directed to apparatus for melting metals by an electrical gas discharge into a gas bubble through which gas is flowing. The gas bubble is formed or developed inside the melting tank adjacent the bottom.

Electric arc furnaces have, for many years, been used for melting scrap or sponge iron to produce molten metal. With this type of furnace the necessary heat is produced by discharging gas between the electrodes arranged above the melt and the surface area of the melt. Steel production with an electric arc furnace can be improved if the loss of refractory, which usually develops through arc radiation in connection with slag deposits, can be reduced.

The present invention improves the production of steel using the electric arc by reducing the wear of refractory; also by partly replacing expensive electric energy with less expensive heat carriers by reducing consumption of the electrodes through better heat utilization.

The invention solves the problem by forming one or more openings with water-cooled tuyeres arranged in the bottom of the melting furnace. Through each opening one or more, preferably three, electrodes, connected to an electric power source, can be inserted. The tips of the electrodes are located in the tuyeres during operation and the combustion/reduction gases flow with high velocity through the tuyeres and surround the electrodes in the tuyeres completely.

The gases, which flow with high velocity through the tuyeres, prevent the melt from entering into the tuyeres and also keep the gas bubble inside the melter intact, through which electrical gas discharge takes place between the electrodes or between electrodes and the melting. The fast flowing gases cool the arc intensively, therefore, the electric conductivity of the arc is low. It is, therefore, possible to operate the unit with high voltage, which results in a smaller unit and also less consumption of carbon electrodes. The electric arc burns steadily and develops in general in the direction of the gas flow. If three A.C. operated electrodes are inserted through a tuyere, there is always an arc burning between the electrodes and the gas flowing through it is heated and also made electrically conductive, which makes it easy to ignite or re-ignite at zero amperes.

Three carbon electrodes inserted through the tuyere are arranged in a tent pitch around the tuyere axis and the axes of the electrodes, meet in one point at the burner opening.

Above the melting tank a shaft can be arranged, which can be fed with melting or reduction material (from the top); through this shaft the combustion/reduction gases move in counterflow.

Gases entering sideways preheat the melting material and make it possible to replace expensive electro-energy with cheaper fuel such as gas, oil, etc. Besides that, good use is made of available energy because of working with counterflow.

In this reduction shaft ore pellets etc. can be used; the reduction process can occur at high temperatures and there is the possibility to preheat the ore etc. with waste gas to temperature above 1,000°C. before feeding into the melting furnace.

A pressure chamber is arranged below each tuyere through which all combustion/reduction gases enter into the tuyere.

The reduction gases necessary for the process are produced in burners through partial combustion of natural gas and are heated in regenerators to approximately 1,300°C. They are led into the pressure chamber, go through the tuyeres and flow through the melting bath. Most of the reduction gases are collected in the gas shaft, led into a container for refinery of steel and then burned up in the burners.

The waste heat of the gases is used in the recuperator to preheat the combustion air for the burners to produce the reduction gas. The waste gases leave through an exhaust fan and the stack.

In the foregoing general description of my invention I have set out certain objects, purposes and advantages. Other objects, purposes and advantages of this invention will be apparent from a consideration of the following description and the accompanying drawings in which:

FIG. 10 is a vertical section through a scrap melting unit with attached steel producing units according to my invention;

FIG. 11 is a section on the line XI—XI of FIG. 10;

FIG. 12 is a section on the line XII—XII of FIG. 10;

FIG. 13 is a vertical section through another embodiment of scrap melting unit with attached steel producing units according to my invention;

FIG. 14 is a section on the line XIV—XIV of FIG. 13; and

FIG. 15 is a section on the line XV—XV of FIG. 13.

Figure 1:
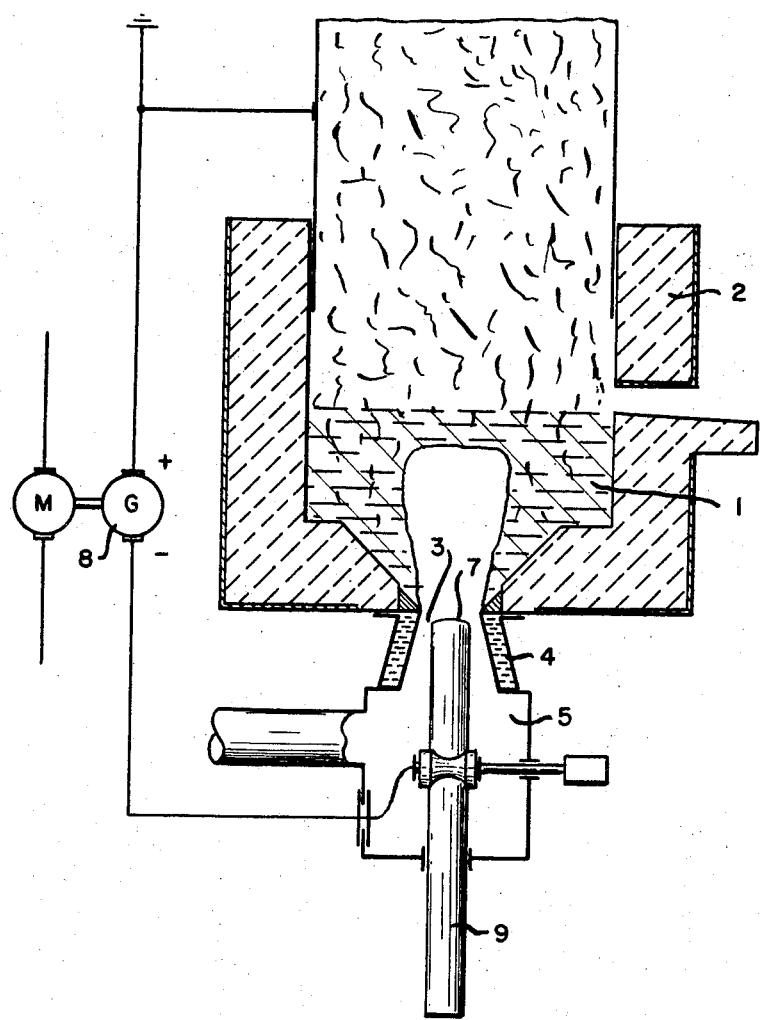
FIG. 1 is a vertical section through a melting tank or furnace showing an electrode and opening at the bottom according to my invention.

Referring to the drawings and particularly to FIG. 1, I have illustrated a melting tank 2 containing scrap 1. In the center of the tank is an opening at the bottom 3, which is surrounded by a water-cooled tuyere 4. Below the tuyere is pressure chamber 5, where the gas supply line ends. The tip 7 of a carbon electrode 9 is located in the melting tank during operation (see drawing) below the narrow cross section. The carbon electrode 9 is connected to a D.C. generator 8 which supplies current thereto. The geometrical configuration of the tuyere and carbon electrode resembles the design of a jet nozzle for high voltage switches with which 200,000 Volt D.C. can be disconnected. Therefore it can be expected that a melting unit can be operated with stress of more than 10,000 Volt. The operation with high voltage decreases substantially the dimensions of the melting tank as well as the electrode consumption and the size of the electrodes required. The melting capacity therefore is increased considerably contrary to the electric arc furnace's capacity.

Figure 3:
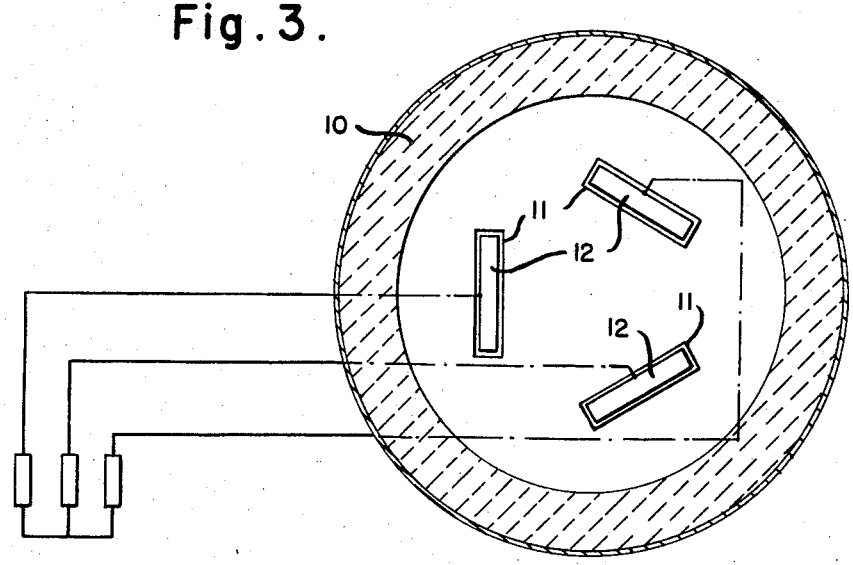
FIG. 3 is a section on the line III—III of FIG. 2.
Figure 2:
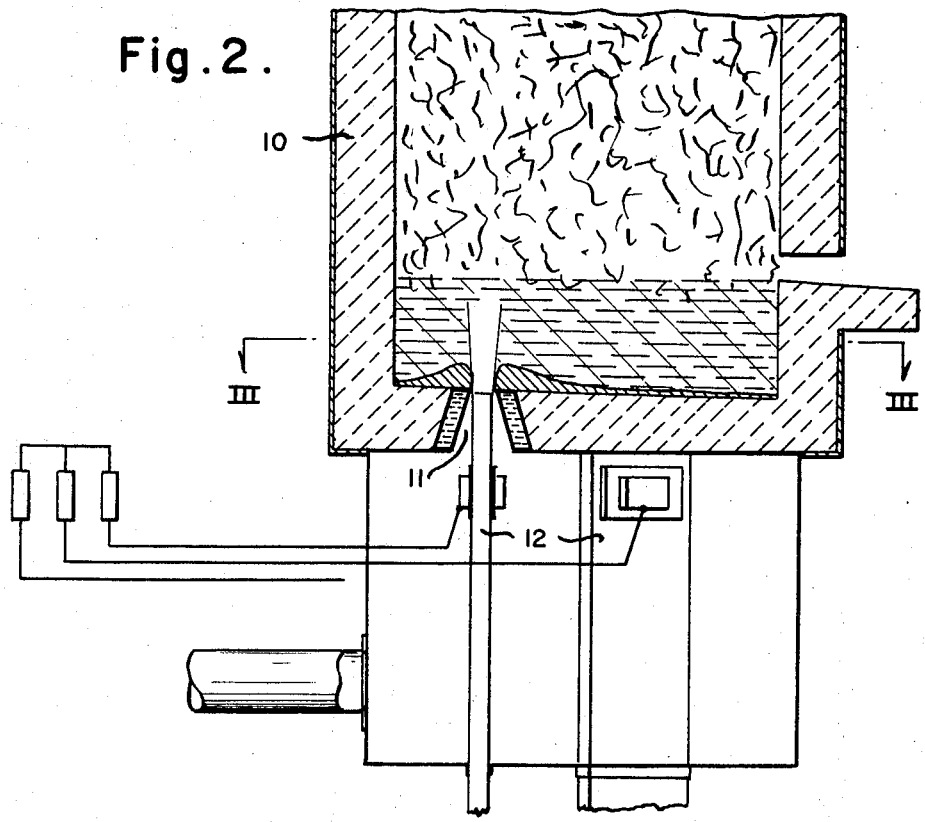
FIG. 2 is a vertical section through a second embodiment of melting tank according to my invention using three electrodes.
Figure 4:
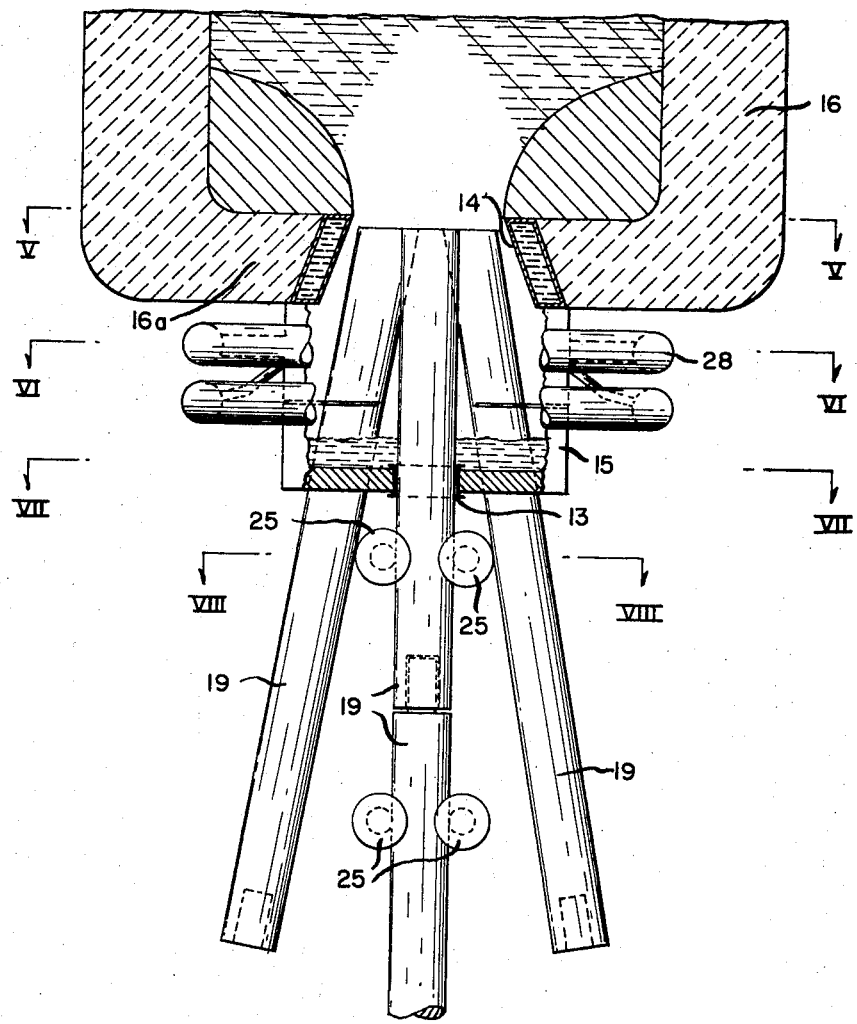
FIG. 4 is a vertical section through a melting tank according to a third embodiment of my invention.
Figure 5:
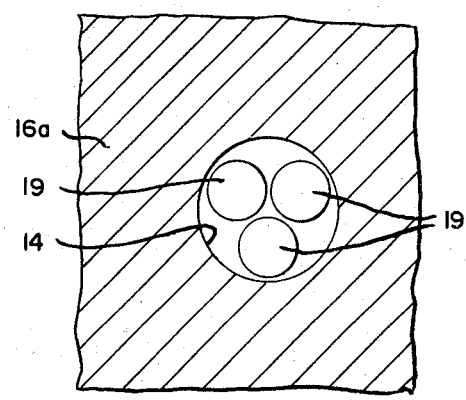
FIG. 5 is a section on the line V—V of FIG. 4.
Figure 6:
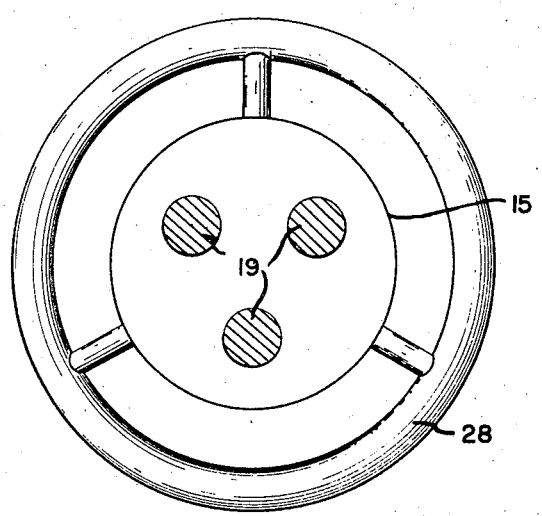
FIG. 6 is a section on the line VI—VI of FIG. 4.
Figure 7:
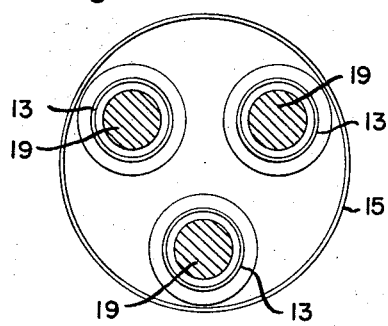
FIG. 7 is a section on the line VII—VII of FIG. 4.
Figure 8:
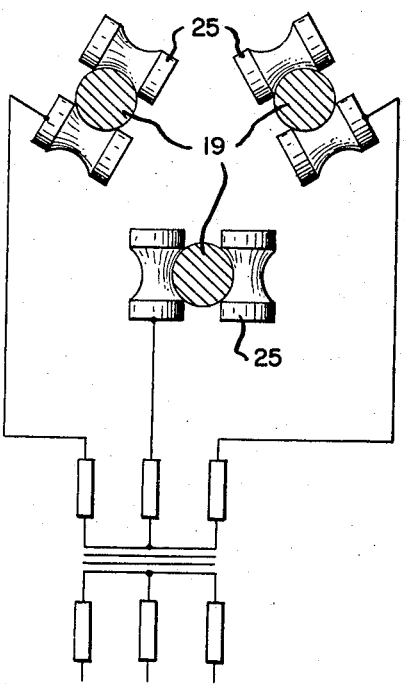
FIG. 8 is a section on the line VIII—VIII of FIG. 4.

FIGS. 2 and 3 show a melting tank 10 with three bottom openings 11. There is a rectangular electrode 12 in each opening. With this arrangement a three-phase current can be used.

In the burner arrangement illustrated in FIGS. 4 to 8, three electrodes 19 are inserted through the tuyere 14 into the bottom 162 of the melting tank 16. The electrodes are arranged in a tent or conical pitch around the axis of the tuyere arch. The carbon electrodes 19 are connected to a three-phase current.

Below the tuyere arch 14 is the pressure chamber 15 into which the reduction gases are fed. If the normal gas supply fails, other gases (for example natural gas) or a sealing compound can be sent through the lines 28 from the supply line.

At the bottom of the pressure chamber are seals 13 through which the electrodes 19 are inserted. The electrodes 19 can be extended during operation by means of feed rolls 25.

Figure 9:
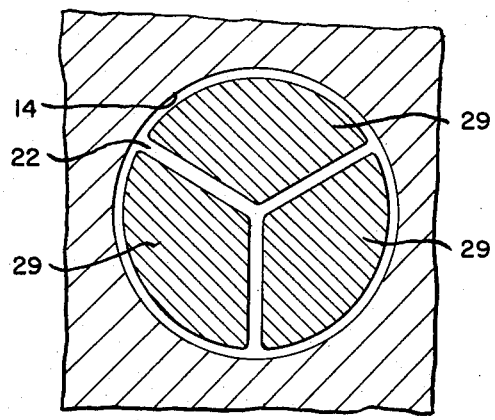
FIG. 9 is a section through a tuyere in which three specially formed electrodes are inserted according to a third embodiment of my invention.

In order to provide a gap 22 of the same size between the electrodes 29 on one side and the electrodes and the tuyere on the other side, at the reduction of the tuyere the electrode 29 form as shown in FIG. 9 is preferred. The same result can be attained however by inserting round electrodes 39, if the tuyere arch 38 is designed as shown in the embodiment of FIG. 14.

FIGS. 10, 11 and 12 show cross sections of a scrap melting unit for a steel mill. Above the melting tank 42 a rectangle chute 43 is arranged which is fed with scrap continuously through a conveyor. Inside the pressure chamber are electrode holders 45a and 45b. Each holder can supply one electrode 49 with current, to lift up and lower and lead the electrodes. On each electrode two electrode holders 45a and 45b may act. Because of electrode deterioration every electrode 49 has to be followed up by another electrode. The upper holder 45a takes care of that till the upper final position is reached. After that the stress apparatus of the lower holder and the current reverser 46 is activated and the lower holder 45b takes over the supply of the electrode. It is switched back to the upper electrode holder 45a as soon as it is back in its original position. These beforementioned measures make an uninterrupted supply of current possible.

The highly heated scrap metal in the melting tank becomes pasty as it is heated and at times will not let the gases pass through, therefore a buildup of gas is possible, which causes a leakage through the tuyeres. To preclude a buildup of gases a gas outlet 56 is provided which penetrates into the space of the tubular extension 57, the melting tank 42 and the lower part of the supply shaft 44.

To preheat the scrap metal, burners 58 are arranged at the periphery of the shaft, whose fuel gases are sent into the shaft. Metal and slag flow through the tap hole 59 from the melting tank 42 into the fore hearth 60, in which slag is removed for the first time. The metal will be tapped from the fore hearth into the container 61.

FIG. 13 shows a melting unit similar to that of FIG. 10 but with two rows of gas tuyeres 71 and 72 connected to bustle pipes 73 and 74 for preheating the scrap in the shaft 44. Gases entering the reduction shaft 44 through tuyeres 71 and bustle 73 are produced in the gas shafts 76 arranged at the circumference of the melting unit. Gases entering through tuyeres 72 and bustle pipe 74 are produced in separate gas generators. Other parts which correspond to those of FIG. 10 bear like numbers.

In the foregoing specification I have set out certain preferred embodiments and practices of my invention, however, it will be obvious that this invention may be otherwise practiced within the scope of the following claims.

I claim:

1. A high temperature furnace unit for melting metals comprising a furnace container, an apparatus in said furnace container for producing high temperatures therein by an electrical discharge into a gas bubble formed within said furnace and including at least one fluid cooled tuyere in the furnace container submerged in the metal in the furnace, at least one electrode in each such tuyere, a source of high voltage electrical discharge current connected to said electrode, and means supplying a combustion/reduction gas at high velocity connected to each said tuyere feeding gas through the tuyere around the electrode at a pressure sufficient to form a pocket of gas around the end of the electrode at the end of the tuyere whereby the electrode is completely surrounded by said gas and the tuyere is kept free of metal.

2. A high temperature furnace as claimed in claim 1 wherein three carbon electrodes are inserted in a tuyere in conical fashion with the three electrode axes intersecting at a point within the furnace beyond the tuyere end.

3. A high temperature furnace as claimed in claim 1 wherein the electrodes are held between feed rollers which advance and retract the electrodes as required.

4. A high temperature furnace as claimed in claim 1 wherein the electrodes are held and advanced between spaced pairs of rollers whereby two electrodes can be successively fed and controlled to provide continuous electrode control and feed to said furnace.

5. A high temperature furnace as claimed in claim 1 having a vertical shaft receiving material to be melted and provided with means for introducing hot waste gases counterflow to said scrap for preheating the same prior to its entering the furnace.

6. A high temperature furnace as claimed in claim 5 wherein the means for introducing the waste gases is at least one annular bristle pipe ring with tuyeres projecting through the stack intermediate its top and bottom.

7. A high temperature furnace as claimed in claim 1 having recuperator means utilizing the waste heat of the used combustible gases for preheating combustion air for the burners which produce the combustible gas.

8. A high temperature furnace as claimed in claim 1 wherein the combustible gases are reduction gases.

9. A high temperature furnace as claimed in claim 8 having recuperator means utilizing the waste heat of the discharged reduction gases for preheating combustion air for burners which produce the reduction gas.

10. An apparatus for producing high temperatures in metals in a melting furnace by an electrical discharge into a gas bubble formed with the furnace and comprising a fluid cooled tuyere submerged in the metal in the furnace through which at least one electrode extends, said electrode being connected to a source of electrical discharge current and means supplying a combustion/reduction gas at high velocity through the tuyere around the said electrode whereby the electrode is completely surrounded by said gas and the tuyere is kept free of metal.

* * * * *